United States Patent
Niederman et al.

(10) Patent No.: US 10,055,277 B1
(45) Date of Patent: Aug. 21, 2018

(54) SYSTEM, METHOD, AND COMPUTER PROGRAM FOR PERFORMING HEALTH CHECKS ON A SYSTEM INCLUDING A PLURALITY OF HETEROGENEOUS SYSTEM COMPONENTS

(71) Applicant: Amdocs Software Systems Limited, Dublin (IE)

(72) Inventors: Raz Niederman, Hod Hasharon (IL); Eliezer Biton, Pardesia (IL); Irit Shamir Shimon, Zichron Yaakov (IL)

(73) Assignees: AMDOCS DEVELOPMENT LIMITED, Limassol (CY); AMDOCS SOFTWARE SYSTEMS LIMITED, Dublin (IE)

( * ) Notice: Subject to any disclaimer, the term of this patent is extended or adjusted under 35 U.S.C. 154(b) by 118 days.

(21) Appl. No.: 14/871,725

(22) Filed: Sep. 30, 2015

(51) Int. Cl.
*G06F 11/30* (2006.01)
*G06F 11/07* (2006.01)

(52) U.S. Cl.
CPC ...... *G06F 11/0793* (2013.01); *G06F 11/0709* (2013.01); *G06F 11/079* (2013.01); *G06F 11/0751* (2013.01); *G06F 11/3058* (2013.01)

(58) Field of Classification Search
CPC ............. G06F 11/0793; G06F 11/0709; G06F 11/0751; G06F 11/079; G06F 11/3058
See application file for complete search history.

(56) References Cited

U.S. PATENT DOCUMENTS

| | | | | |
|---|---|---|---|---|
| 6,763,369 | B1* | 7/2004 | Ytuarte | H04Q 3/0091 379/269 |
| 7,954,014 | B2 | 5/2011 | Wang et al. | |
| 7,979,733 | B2 | 7/2011 | Erdtmann et al. | |
| 8,117,146 | B2 | 2/2012 | Sankar et al. | |
| 8,595,556 | B2* | 11/2013 | Caffrey | G06F 11/0709 714/33 |
| 2008/0263404 | A1* | 10/2008 | Vidiyala | G06F 11/0748 714/38.14 |
| 2009/0158099 | A1* | 6/2009 | Cui | G06F 11/0748 714/57 |

(Continued)

*Primary Examiner* — Paul Contino
(74) *Attorney, Agent, or Firm* — Zilka-Kotab, P.C.

(57) ABSTRACT

A system, method, and computer program product are provided for performing health checks on a system including a plurality of heterogeneous system components. In use, incoming metrics are received from a system including a plurality of heterogeneous components. Each of the incoming metrics are associated with one or more of the plurality of heterogeneous components. An expected value is identified for each of the received metrics from a repository including a plurality of expected values each associated with one or more of a plurality of metrics. Values of each of the received metrics are compared with a corresponding identified expected value to identify one or more anomalies in the received metrics. Further, at least one rule to utilize is identified, based on the identified one or more anomalies in the received metrics. Additionally, one or more solutions to remedy at least one cause of the one or more anomalies in the received metrics are identified, based on the at least one rule. Moreover, the identified one or more solutions to remedy the at least one cause of the one or more anomalies in the received metrics are reported.

15 Claims, 5 Drawing Sheets (56) References Cited

U.S. PATENT DOCUMENTS

| | | | |
|---|---|---|---|
| 2010/0218030 A1* | 8/2010 | Bhatnagar | G06F 11/0748 714/2 |
| 2012/0144236 A1* | 6/2012 | Black | H04L 41/145 714/25 |
| 2013/0007527 A1* | 1/2013 | Petukhov | G06F 11/0793 714/37 |
| 2014/0172371 A1* | 6/2014 | Zhu | G06F 11/0709 702/185 |
| 2015/0052122 A1* | 2/2015 | Landry | G06F 11/0706 707/723 |
| 2016/0057034 A1* | 2/2016 | Rosier | H04L 41/0883 709/224 |
| 2016/0077910 A1* | 3/2016 | Dev | G06F 11/0793 714/4.3 |
| 2017/0075749 A1* | 3/2017 | Ambichl | G06F 11/079 |

* cited by examiner

FIGURE 5

SYSTEM, METHOD, AND COMPUTER PROGRAM FOR PERFORMING HEALTH CHECKS ON A SYSTEM INCLUDING A PLURALITY OF HETEROGENEOUS SYSTEM COMPONENTS

FIELD OF THE INVENTION

The present invention relates to performing health checks on systems, and more particularly to performing health checks on systems with heterogeneous components to provide a comprehensive overall health assessment for such systems and components.

BACKGROUND

Managing a complex system with heterogeneous components typically results in specific silo monitoring solutions. These specific silo monitoring solutions are detached from one another and do not provide a single centralized view of the system efficiency, operability, utilization, and configuration.

In the health check domain, one main impediment includes not having the capability to analyze changes performed on certain modules of the system in addition to not having the capability to determine the impacts of the changes on other modules of the system. In addition, managing separate monitoring systems results in duplication of efforts, a non-formalized view of the system capabilities, and ultimately a waste of effort and resources.

There is thus a need for addressing these and/or other issues associated with the prior art.

SUMMARY

A system, method, and computer program product are provided for performing health checks on a system including a plurality of heterogeneous system components. In use, incoming metrics are received from a system including a plurality of heterogeneous components. Each of the incoming metrics are associated with one or more of the plurality of heterogeneous components. An expected value is identified for each of the received metrics from a repository including a plurality of expected values each associated with one or more of a plurality of metrics. Values of each of the received metrics are compared with a corresponding identified expected value to identify one or more anomalies in the received metrics. Further, at least one rule to utilize is identified, based on the identified one or more anomalies in the received metrics. Additionally, one or more solutions to remedy at least one cause of the one or more anomalies in the received metrics are identified, based on the at least one rule. Moreover, the identified one or more solutions to remedy the at least one cause of the one or more anomalies in the received metrics are reported.

DETAILED DESCRIPTION

Figure 1:
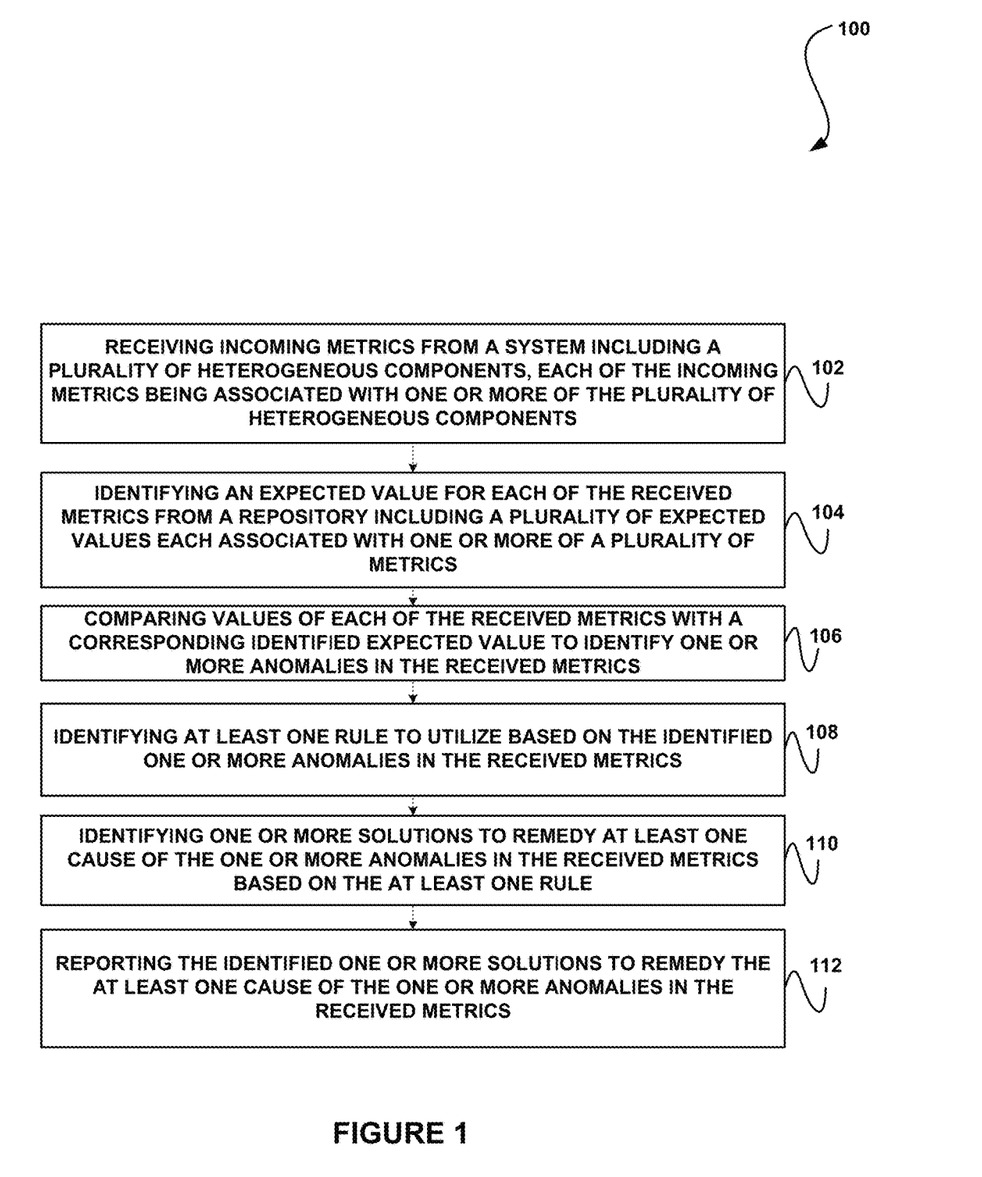
FIG. 1 illustrates a method for performing health checks on a system including a plurality of heterogeneous system components, in accordance with one embodiment.

FIG. 1 illustrates a method 100 for performing health checks on a system including a plurality of heterogeneous system components, in accordance with one embodiment.

As shown, incoming metrics are received from a system including a plurality of heterogeneous components. See operation 102. Each of the incoming metrics are associated with one or more of the heterogeneous components.

The heterogeneous components may include various systems, databases, hardware, and software, etc. The components may be subsystems of a larger system, such as a company-wide system, or organizational-wide system, etc.

Receiving the incoming metrics from the system includes collecting health-state metrics for the heterogeneous components. The metrics may include any information associated with determining a health, status, integrity, and/or various other condition-related information associated with one or more of the components.

For example, the received metrics may be associated with a hardware health check of one or more of the heterogeneous components. As another example, the received metrics may be associated with a software health check of one or more of the heterogeneous components. As another example, the received metrics may be associated with a system configuration health check for the system and/or one or more of the heterogeneous components.

As yet another example, the received metrics may be associated with a user experience health check associated with one or more of the heterogeneous components. Additionally, the received metrics may be associated with a business transactions health check associated with one or more of the heterogeneous components. As another example, the received metrics may be associated with an operability and security health check associated with one or more of the heterogeneous components.

As show further in FIG. 1, an expected value is identified for each of the received metrics from a repository including a plurality of expected values each associated with one or more of a plurality of metrics. See operation 104. The expected value for the metrics may be based on historical data, engineering data, best practices, and/or various other types of expected data (e.g. simulations, etc.).

Values of each of the received metrics are compared to a corresponding identified expected value to identify one or more anomalies in the received metrics. See operation 106.

For example, identifying anomalies in the received metrics may include determining whether the values of each of the received metrics are equal to the corresponding identified expected value. As another example, identifying anomalies in the received metrics may include determining whether the values of each of the received metrics are within an acceptable range of the corresponding identified expected value, etc.

Further, at least one rule to utilize is identified, based on the identified one or more anomalies in the received metrics. See operation 108. The rule may be identified in a rules repository, where each rule in the repository corresponds to one or more known anomalies capable of being identified in the metrics.

Additionally, one or more solutions to remedy at least one cause of the one or more anomalies in the received metrics are identified, based on the at least one rule. See operation 110.

In one embodiment, identifying the solutions may include performing an analysis based on the one or more anomalies, the at least one rule, and available solutions. In this case, the available solutions may be stored in a repository including a plurality of predefined solutions.

Further, in one embodiment, identifying the solutions may include performing a lookup operation to determine whether a predefined solution exists for a corresponding anomaly in a repository including a plurality of predefined solutions. In this case, if it is determined that the predefined solution does not exist for the corresponding anomaly in the repository including the predefined solutions, a new solution to remedy a cause of the corresponding anomaly may be automatically created. This may include creating the solution based on similar solutions to similar anomalies, etc.

Moreover, the identified one or more solutions to remedy the at least one cause of the one or more anomalies in the received metrics are reported. See operation 112. The one or more solutions may be reported to users and/or systems for remedying the anomalies.

For example, reporting the identified solutions to remedy the cause of the anomalies in the received metrics may include presenting the identified solutions to at least one user associated with a system component corresponding to the anomalies. As another example, reporting the identified solutions to remedy the cause of the anomalies in the received metrics may include presenting the identified one or more solutions utilizing at least one user interface.

In one embodiment, the identified solutions may be automatically implemented. For example, the solution may be identified and be reported to a system for implementing the solution such that the solution is automatically implemented.

As an example implementation of the method 100, a process associated with one of the components of the system may require the use of a certain number of threads to perform acceptably (e.g. to perform without crashing, to perform well enough to achieve an acceptable user experience, etc.). Upon receipt of a metric associated with the process, the expected value (e.g. 10 threads, etc.) may be compared to the actual received value (e.g. 1 thread, etc.) to determine that there is an anomaly with the metric.

A rule associated with the process may then be identified that indicates, as a rule, a minimum of 10 threads must be used for this particular process. As a result, a solution may be identified that includes increasing the number of threads being used to the required number (e.g. in this example, 10 threads, etc.). In various embodiments, this solution may be presented/reported to the relevant component (or a user of the component/system, etc.), or the solution may be automatically implemented (e.g. an instruction may be sent to increase the number of threads utilized to 10 threads, etc.).

In one embodiment, the identified solutions may be reported as unformatted suggested solutions. In this case, the unformatted suggested solutions may be automatically formatted according to one or more predefined templates.

Further, in at least one implementation of the method 100, a learning module (i.e. computer code) may be utilized to learn from implemented solutions and the effect on future anomalies, and/or other components of this system, etc. In this case, the learning module may detect and 'learn' how an anomaly or solution associated with a component in the system effects one or more other components of the system.

Thus, in one embodiment, the method 100 may include evaluating and rating the identified solutions through correlation of the incoming metrics from the heterogeneous components. Moreover a solutions database including a plurality of possible solutions for detected anomalies may be updated based on evaluating and rating the identified solutions.

It should be noted that two or more of the operations of the method 100 may be combined, in various embodiments. It should also be noted that the method 100 may be implemented utilizing various hardware, software, applications, user interfaces, etc., as dictated by the implementer. In the context of the present description, a module refers to computer code and/or software applications, etc., which may be executed utilizing or in conjunction with various processors, databases, and memory, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
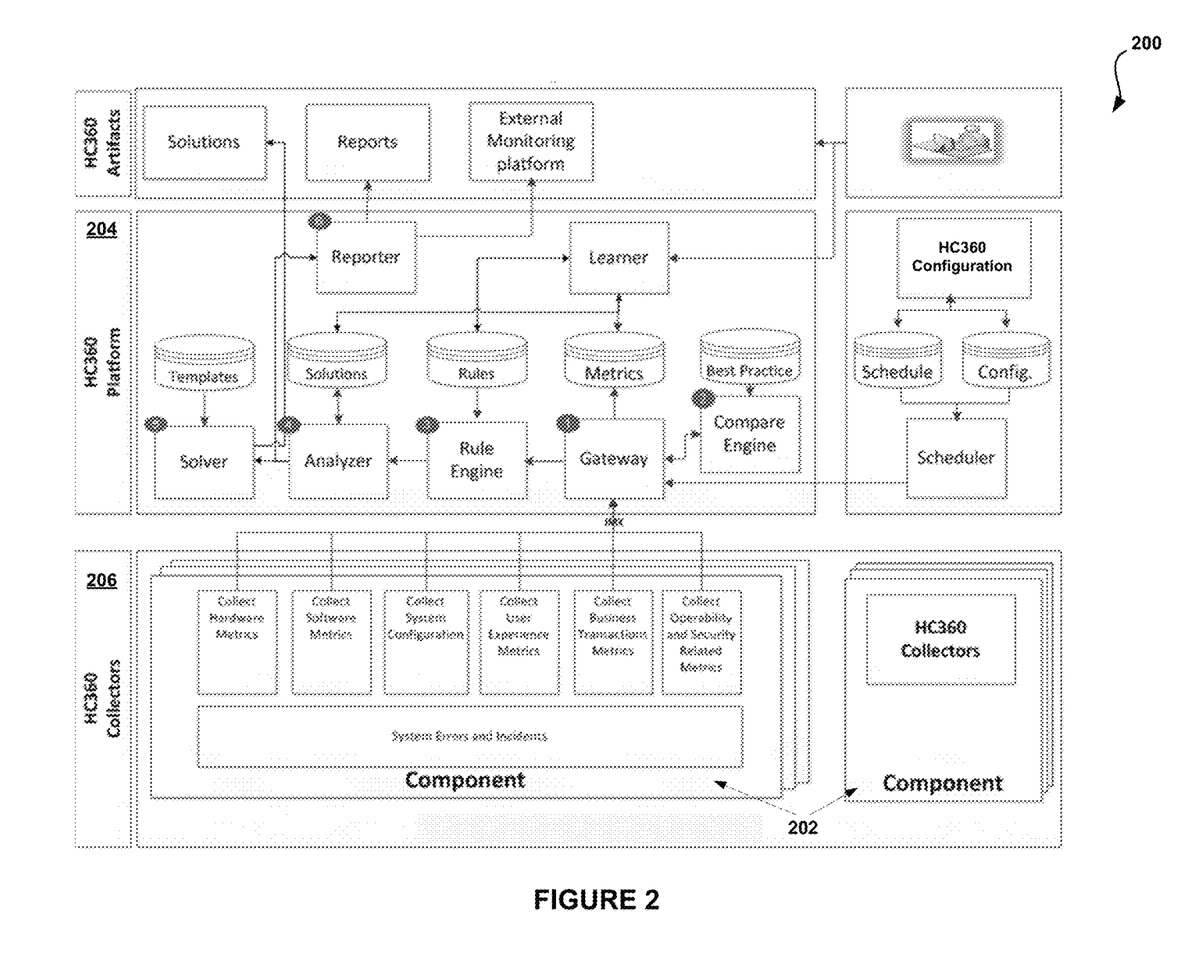
FIG. 2 illustrates a system for performing health checks on a system including a plurality of heterogeneous system components, in accordance with one embodiment.

FIG. 2 illustrates a system 200 for performing health checks on a system including a plurality of heterogeneous system components, in accordance with one embodiment. As an option, the system 200 may be implemented in the context of the details of FIG. 1. Of course, however, the system 200 may be implemented in the context of any desired environment. Further, the aforementioned definitions may equally apply to the description below.

Managing a complex system with heterogeneous components results many times in specific silo monitoring solutions. These specific silo monitoring solutions are detached from one another and do not provide a single centralized view of the system efficiency, operability, utilization, and configuration. The system 200 addresses this issue of health checking complex systems and offers the ability to fix such systems when the systems diverge from the nominal states.

In the health check domain, one main impediment includes not having the capability to analyze changes performed on certain modules of the system and not having the capability to determine the impacts of the changes on other modules. In addition, managing separate monitoring systems results in duplication of efforts, a non-formalized view of the system capabilities, and ultimately a waste of effort and resources.

The system 200 presents a solution that provides a holistic view (i.e. a "360 degree" view, etc.) of a system's health state, by providing integrated monitoring, logging, and reporting capabilities in order to support troubleshooting functionality.

The solution provided by the system 200, also referred to herein as "Health Check 360" or "HC360", solves the aforementioned issues (among others) using various ranges of un-documented scripts, tools and systems, and aims to provide a clear view of a system in its entirety. In operation, the system 200 also provides a full health status in production state by monitoring all components and continuously comparing the monitored value to a best practices reference. The system 200 detects discrepancies in metrics and provides guidelines to correct the discrepancies, as well as proactively correcting the discrepancies in some cases.

Compared to current solutions on the market, the system 200 does not try to manage any situations and any IT maintenance tasks. The implementation of system 200 takes a different approach as it provides a guided sequence of steps that flow the health checking, monitoring, and fixing tasks in one comprehensive system.

The system 200 differs from previous solutions by exposing a global apparatus implementing a pre-defined algorithm that performs various tasks (e.g. itemized below). As a result, the system 200 is easier to manage in terms of configuration, control, performance checking, and learning capabilities than previously available solutions.

The system 200 enables customers to maximize the value of complex systems (e.g. such as Amdocs CES platform, etc.) by optimizing their system operations and configuration based on known and collected implementation guidelines. The system 200 is composed of a centralized tool to enable configuration, maintenance, reporting and implementation validation, which enables presentation of alerts on misalignments or risks, including the potential impact on the complex system.

The system 200 includes various heterogeneous components 202. The system 200 also includes a subsystem that provides recommendations on alerts and misalignments based on known best practice implementations. The system 200 provides constant learning mechanisms for correlating between various incidents and their impacts, as well suggesting the best solutions in order to solve causes of the incidents.

The system 200 has a repository of validation techniques including best practices and rules. The system 200 uses external monitoring frameworks to collect health-state metrics of the various system components. The system 200 compares health-state metrics with its corresponding knowledge base, generates alerts, suggests the most appropriate solution, and optionally applies the solution automatically on the system.

The system 200 includes two major modules, the platform module 204 and the collector module 206.

The platform module 204 stores and analyzes all incoming metrics from the components of system 200. The platform module 204 compares the metrics with its related best practices and the defined rules base and can trigger actions related to this analysis. The action may include an alert, a fix, or a report to an external monitoring system.

The platform module 204 may include various sub-modules, including a Compare Engine (CE), a Gateway, a Rule Engine (RE), an Analyzer, a Solver, a Reporter, and a Learner.

In operation, the Gateway collects all incoming metrics from the monitored components of the system (or more), sends the incoming metrics to the Compare Engine, and stores inside a database only the returned metrics with values that are different from what they should be as defined in a Best Practice database (i.e. a reference metric database or an expected value database, etc.). In addition, the Compare Engine dispatches these metrics to the Rule Engine for further processing.

The Compare Engine receives the metrics, retrieves the metrics' equivalent metrics set from the Best Practice database and compares between them, returning back metrics with discrepancies only.

The Rule Engine triggers an event call to the Analyzer upon activation of a specific rule associated with the discrepancies between values for a specific metric or set of metrics.

The Analyzer performs an analysis process of input metrics' discrepancies, rules, available solutions (e.g. fixes) and their rates in order to determine the best solution. In the case that no solution is available, in one embodiment, the Analyzer may create a new solution. The Analyzer also will dispatch the solution details to the Reporter and, in one embodiment, the Solver.

The Reporter may receive unformatted suggested solutions and format the solutions according to defined templates. In one embodiment, a solution (e.g. a fix) may be published via mail directly to external monitoring interfaces via Java Management Extensions (JMX).

In one embodiment, the platform module 204 may include a Solver module that receives unformatted suggested solutions and formats the unformatted suggested solutions according to the defined templates. In one embodiment, a solution may be provided in a simple form, such as a textual based output. An additional optional capability that may be implemented is to work in an automatic correction mode and to implement the solution automatically in order to fix the problem.

The platform module 204 may also optionally include a Learner module that constantly evaluates and rates the solutions used by the system through correlation of all incoming metrics from the components of the system. The Solver may work in a progressive mode from previous development and efforts such as non-functional testing stages to acquire a reliable knowledge base. New versions of components, etc. may introduce their own new practices and solutions, which may be migrated as well. For a first time production implementation without aggregated knowledge base, the Learner may work on an empty knowledge base. For example, the Learner may learn about connections and solutions and may aggregate this knowledge in staging mode until it is decided to activate functionality based on the knowledge. An additional optional capability includes receiving solution rates from external interfaces, such as manual feedback from users for existing solutions, as well rating possible solutions that are currently stored on staging.

In one embodiment, the Collector module may include a Java JMX toolkit that provides wide validations coverage (not limited), including various monitoring areas such as hardware health checks, software health checks, system configuration health checks, user experience health checks, business transactions health checks, and operability and security health checks, etc.

Hardware health checks may include measuring CPU usage, memory, and storage utilizations for both physical and virtual servers, and calculating resource allocation and hardware settings and flags. For instance, a hardware health check may cause altering of the system if metrics reach 80% CPU utilization, or 90% of the disk space capability, large pages settings, etc.

Software health checks may include monitoring capabilities of all software that is related to a specific system, such as third parties, application servers, processes and daemons, memory, CPU and I/O utilization, productivity metrics, and any desired runtime metrics to be monitored such as queues, connections, statuses, platform matrixes and versions, etc.

System configuration health checks may include a dynamic set of best practices and validations rules to ensure that the system is configured appropriately. This may include various area coverages such as web application servers, operating systems kernel parameters, database configuration parameters, etc. The system 200 enables any new technology that is added to the system to be monitored.

User experience health checks include checks for a specific user defined business flow the system enables and may be related to end user experience, such as mobile based applications, or any other user interface based systems that might have an impact on user experience.

Business transactions health checks include checking whether a specific defined business flow is running smoothly, such as checking expected volumes that behave differently from one system deployment to another to ensure the end to end business flows meet a defined response time and to make sure there is nothing that indicates a slowdown on system performance, or any additional related measurements that requires monitoring. End to end flow may be defined as a simple roundtrip within a single application or a very complex flows that may involve several different applications with a very complicated routing path.

Operability and security health checks may include checking system applications' related status that indicate a current status (e.g. such as up and running, down, etc.). For cloud computing, this may be useful for setting the system elasticity according to peak hours and comparing to the best practice. This may cause generation of alerts related to increasing or reducing application instances accordingly. Security related aspects may include, for example, certifications expiration dates, users' rejected logins, and any related metrics that should be monitored.

Thus, FIG. 2 generally illustrates the system and component flow associated with the system referred to herein as HC360.

HC360 may be designed in a modular way in order to have a clear step-by-step mechanism, where each step can be configured independently. Such modular architecture simplifies configuration and the evaluation of system performance in terms of number of issues identified, solutions (e.g. fixes) applied, and validity of the solutions compared to the state of the system.

With further reference to FIG. 2, HC360 Configuration refers to a user interface for setting up the HC360 scheduling, configuration and instructions for the platform module and collectors details of a specific system.

The HC360 Collector 206 refers to one or more toolkits that are resident inside the monitored component of a specific system (e.g. a single toolkit for each component, etc.). The one or more toolkits collect the desired metrics that will be collected (e.g. via JMX) by the Gateway. This may be triggered in time intervals defined by a scheduler. Each toolkit may be configured with the desired monitoring coverage.

The HC360 Platform 204 refers to the metrics collection process performed by the Gateway from toolkits, comparing the metrics with their corresponding best practice values, documenting only those metrics with anomalies, and dispatching an analysis process in order to determine the root cause of the anomalies, as well the most appropriate solution for the cause of the anomalies.

The Analyzer analyzes the current situation, rules, and relevant solutions (if they exist) and determines a solution. The Analyzer is also capable of deploying the solution automatically. The optional Learner module is capable of learning system behavior and patterns, as well as correlations between the various monitoring areas, rates and even can create new solutions based on that constant learning.

HC360 Artifacts refers to related outputs and interfaces of the HC360 Platform to external systems.

Some key improvements offered by the HC360 system, as opposed to previously existing solutions include, for example: consolidation of all validations to a single platform and serving as one source for implementing new configuration validations; serving as a best practice technical repository for implementation know how gathered through time; implementation of metrics discrepancies analysis; alerting and suggesting solutions; and self-learning and healing capabilities, etc.

Figure 3:
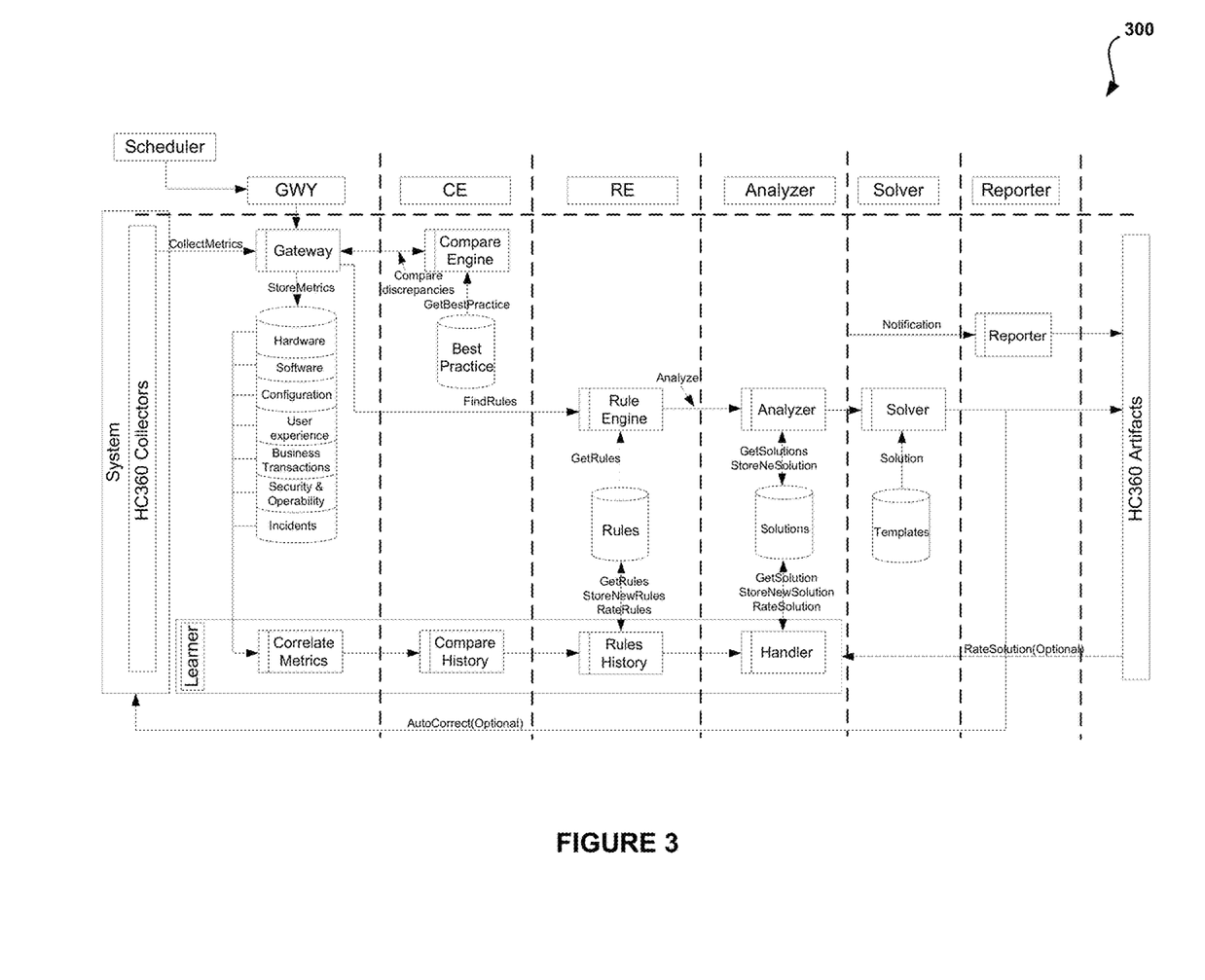
FIG. 3 illustrates a system work flow diagram for performing health checks on a system including a plurality of heterogeneous system components, in accordance with one embodiment.

FIG. 3 illustrates a system flow diagram 300 for performing health checks on a system including a plurality of heterogeneous system components, in accordance with one embodiment. As an option, the diagram 300 may be implemented in the context of the details of the previous figures. Of course, however, the diagram 300 may be implemented in the context of any desired environment. Further, the aforementioned definitions may equally apply to the description below.

As shown, the Gateway module receives metrics collected from a plurality of collector modules. The collector modules may be associated with monitoring a plurality of components and subsystems of a system being monitored.

The Gateway module sends the incoming metrics to the Compare Engine. The Gateway module also stores the metrics with values that are different from what they should be as defined in a Best Practice database (i.e. a reference metric database).

The Compare Engine receives the metrics from the Gateway Module, retrieves the metrics' equivalent metrics set from the Best Practice database and compares between the received metrics and the reference metrics, returning back metrics with discrepancies to the Gateway module.

The Rule Engine triggers an event call to the Analyzer module upon activation of a specific rule associated with the discrepancies between values for a specific metric or set of metrics.

The Analyzer module performs an analysis process of input metrics' discrepancies, rules, available solutions (e.g. fixes) and their rates in order to determine the best solution. In the case that no solution is available, in one embodiment, the Analyzer module may create a new solution. The Analyzer module also will dispatch the solution details to the Reporter module and, in one embodiment, the Solver module.

The Reporter module may receive unformatted suggested solutions and format the solutions according to defined templates. The Solver module receives unformatted suggested solutions and formats the unformatted suggested solutions according to the defined templates. The Learner module constantly evaluates and rates the solutions used by the system through correlation of all incoming metrics from the components of the system.

In one embodiment, results of the Reporter module, etc. may be presented utilizing a Summary Health Check dashboard user interface that may also display configuration alerts, metrics, and graphical artifacts, also offering the ability to review more information using additional data formats.

In terms of functionality, the solution described herein overcomes various limitations of previously existing solutions by offering a health check solution that is an end to end solution looking at overall characteristics of a complex system as a centralized view of the system efficiency, operability, utilization, and configuration. The systems and techniques described herein break down the overall monitoring, analysis, and solving mechanism into self-designed and consistent steps. As a result of this modular architecture, it is easy to control the performance of the system and to fix monitored components, as well as learning from the identified issues and applied fixes.

Figure 4:
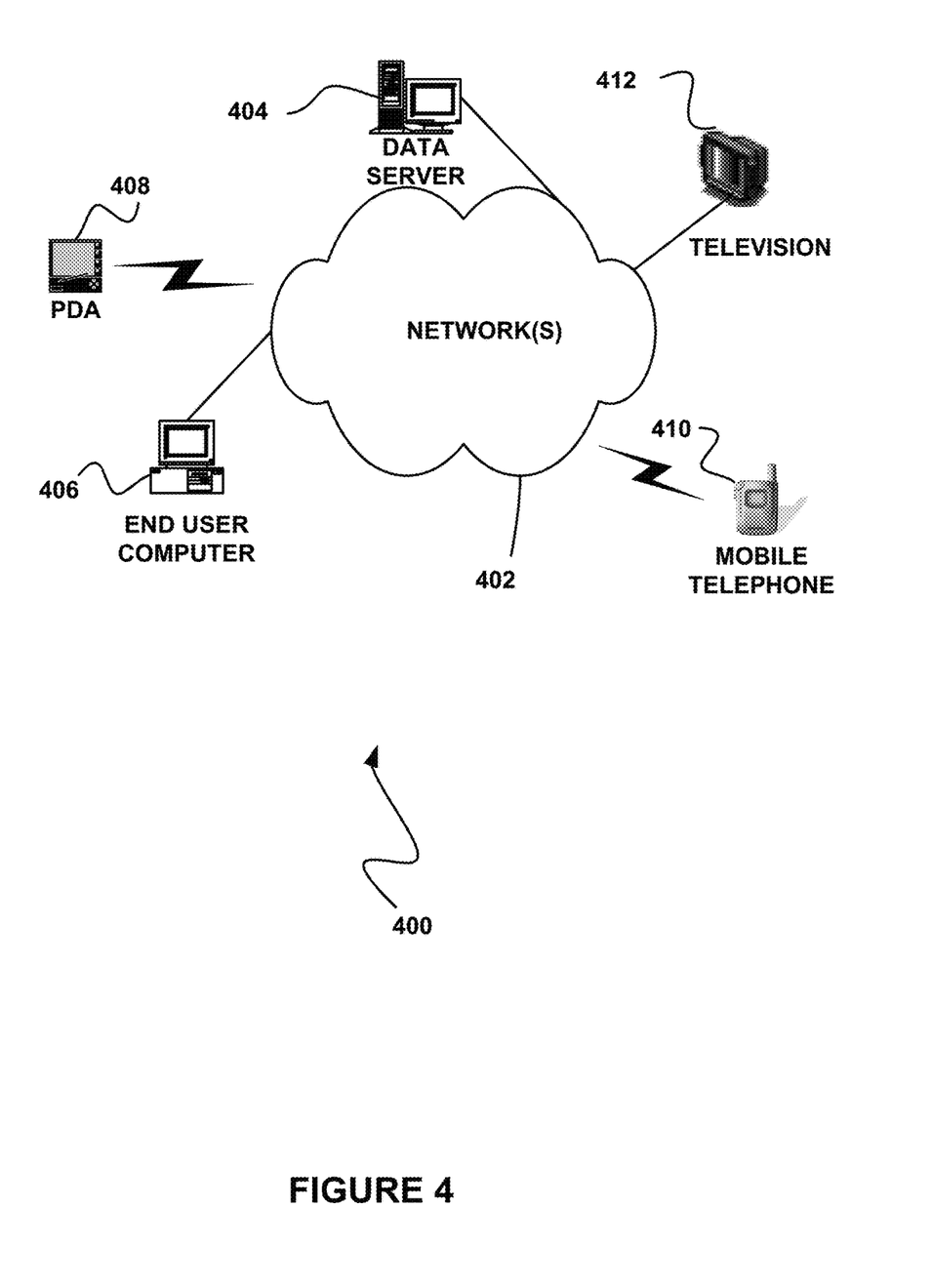
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
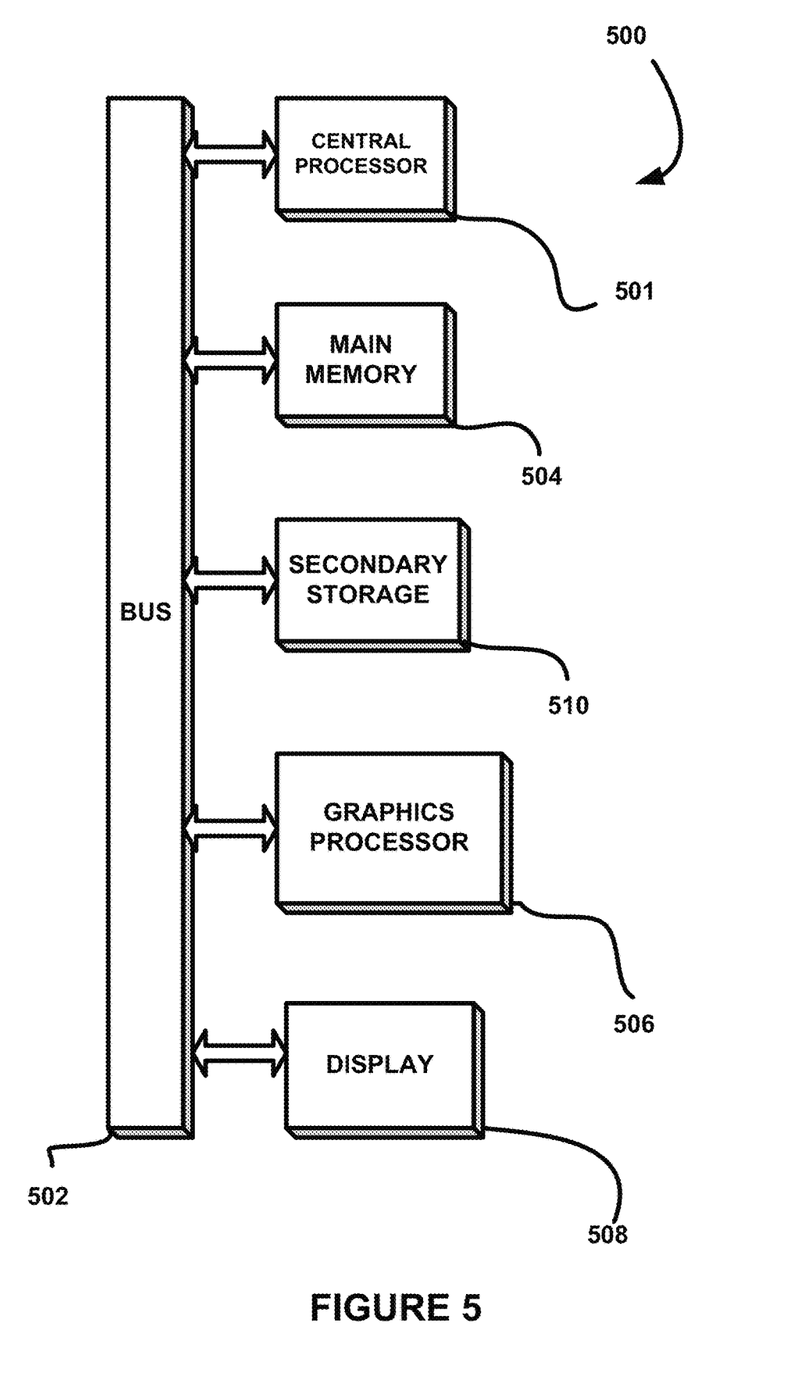
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising computer code for:
receiving, by a centralized tool being executed by a computer processor, incoming metrics from a system including a plurality of heterogeneous components, each of the incoming metrics being associated with one or more of the plurality of heterogeneous components and the plurality of heterogeneous components including different hardware and software components of the system;
identifying, by the centralized tool, an expected value for each of the received metrics from a repository including a plurality of expected values each associated with one or more of a plurality of metrics;
comparing, by the centralized tool, values of each of the received metrics with a corresponding identified expected value to identify one or more anomalies in the received metrics;
identifying, by the centralized tool, at least one rule to utilize based on the identified one or more anomalies in the received metrics;
automatically identifying, by the centralized tool, one or more solutions to remedy at least one cause of the one or more anomalies in the received metrics based on the at least one rule, the one or more solutions being identified from a database of solutions for detected anomalies;
automatically implementing, by the centralized tool, the identified one or more solutions to remedy the at least one cause of the one or more anomalies in the received metrics;
for each of the one or more solutions implemented by the centralized tool, learning, by the centralized tool, an effect of the implementation of the solution on the heterogeneous components of the system including additional anomalies resulting from the implementation of the solution; and
updating, by the centralized tool, the database of solutions based on the effect learned for each of the one or more solutions implemented by the centralized tool;
wherein one of the heterogeneous components is a process and the incoming metrics associated with the process is a number of threads being used by the process, wherein the number of threads being used by the process is less than the corresponding identified expected value which is an expected number of threads required by the process, wherein a rule of the at least one rule specifies that the expected number of threads must be used for the process, and a solution of the one or more solutions is automatically implemented to increase the number of threads being used by the process to the expected number of threads required by the process.

2. The computer program product of claim 1, further comprising computer code for evaluating and rating the identified one or more solutions through correlation of the incoming metrics from the plurality of heterogeneous components.

3. The computer program product of claim 1, wherein one or more of the received metrics are associated with a hardware health check of the one or more of the plurality of heterogeneous components.

4. The computer program product of claim 1, wherein one or more of the received metrics are associated with a software health check of the one or more of the plurality of heterogeneous components.

5. The computer program product of claim 1, wherein one or more of the received metrics are associated with a system configuration health check for the system.

6. The computer program product of claim 1, wherein one or more of the received metrics are associated with a user experience health check associated with the one or more of the plurality of heterogeneous components.

7. The computer program product of claim 1, wherein one or more of the received metrics are associated with a business transactions health check associated with the one or more of the plurality of heterogeneous components.

8. The computer program product of claim 1, wherein one or more of the received metrics are associated with an operability and security health check associated with the one or more of the plurality of heterogeneous components.

9. The computer program product of claim 1, wherein identifying one or more anomalies in the received metrics includes determining whether the values of each of the received metrics are equal to the corresponding identified expected value.

10. The computer program product of claim 1, wherein identifying the one or more solutions includes performing an analysis based on the one or more anomalies, the at least one rule, and available solutions.

11. The computer program product of claim 1, wherein identifying the one or more solutions includes performing a database lookup operation to determine whether a predefined solution exists for a corresponding anomaly.

12. The computer program product of claim 1, wherein receiving the incoming metrics from the system including the plurality of heterogeneous components includes collecting health-state metrics for the plurality of heterogeneous components.

13. The computer program product of claim 1, wherein the effect of the implementation of the solution on the heterogeneous components of the system includes the effect of the implementation of the solution on heterogeneous components of the system other than the heterogeneous component of the system on which the solution is implemented.

14. A method, comprising:
receiving, by a centralized tool being executed by a computer processor, incoming metrics from a system including a plurality of heterogeneous components, each of the incoming metrics being associated with one or more of the plurality of heterogeneous components and the plurality of heterogeneous components including different hardware and software components of the system;
identifying, by the centralized tool, an expected value for each of the received metrics from a repository including a plurality of expected values each associated with one or more of a plurality of metrics;
comparing, by the centralized tool, values of each of the received metrics with a corresponding identified expected value to identify one or more anomalies in the received metrics;
identifying, by the centralized tool, at least one rule to utilize based on the identified one or more anomalies in the received metrics;
automatically identifying, by the centralized tool, one or more solutions to remedy at least one cause of the one or more anomalies in the received metrics based on the at least one rule, the one or more solutions being identified from a database of solutions for detected anomalies; and
automatically implementing, by the centralized tool, the identified one or more solutions to remedy the at least one cause of the one or more anomalies in the received metrics;
for each of the one or more solutions implemented by the centralized tool, learning, by the centralized tool, an effect of the implementation of the solution on the heterogeneous components of the system including additional anomalies resulting from the implementation of the solution; and
updating, by the centralized tool, the database of solutions based on the effect learned for each of the one or more solutions implemented by the centralized tool;
wherein one of the heterogeneous components is a process and the incoming metrics associated with the process is a number of threads being used by the process, wherein the number of threads being used by the process is less than the corresponding identified expected value which is an expected number of threads required by the process, wherein a rule of the at least one rule specifies that the expected number of threads must be used for the process, and a solution of the one or more solutions is automatically implemented to increase the number of threads being used by the process to the expected number of threads required by the process.

15. An apparatus, comprising:
one or more hardware processors of a centralized tool for:
receiving, by the centralized tool, incoming metrics from a system including a plurality of heterogeneous components, each of the incoming metrics being associated with one or more of the plurality of heterogeneous components and the plurality of heterogeneous components including different hardware and software components of the system;
identifying, by the centralized tool, an expected value for each of the received metrics from a repository including a plurality of expected values each associated with one or more of a plurality of metrics;
comparing, by the centralized tool, values of each of the received metrics with a corresponding identified expected value to identify one or more anomalies in the received metrics;
identifying, by the centralized tool, at least one rule to utilize based on the identified one or more anomalies in the received metrics;
automatically identifying, by the centralized tool, one or more solutions to remedy at least one cause of the one or more anomalies in the received metrics based on the at least one rule, the one or more solutions being identified from a database of solutions for detected anomalies;
automatically implementing, by the centralized tool, the identified one or more solutions to remedy the at least one cause of the one or more anomalies in the received metrics;
for each of the one or more solutions implemented by the centralized tool, learning, by the centralized tool, an effect of the implementation of the solution on the heterogeneous components of the system including additional anomalies resulting from the implementation of the solution; and
updating, by the centralized tool, the database of solutions based on the effect learned for each of the one or more solutions implemented by the centralized tool;
wherein one of the heterogeneous components is a process and the incoming metrics associated with the process is a number of threads being used by the process, wherein the number of threads being used by the process is less than the corresponding identified expected value which is an expected number of threads required by the process, wherein a rule of the at least one rule specifies that the expected number of threads must be used for the process, and a solution of the one or more solutions is automatically implemented to increase the number of threads being used by the process to the expected number of threads required by the process.

* * * * *